US012441042B2

(12) United States Patent
Dulipeta et al.

(10) Patent No.: US 12,441,042 B2
(45) Date of Patent: Oct. 14, 2025

(54) SYSTEM AND METHOD FOR MOLD INSERT VENTING AND VENTING GAS ENTRAPMENT IN ANY MOLDING DEVICE

(71) Applicant: AarKel Tool and Die Inc, Wallaceburg (CA)

(72) Inventors: Vilas Ravindra Dulipeta, Dresden (CA); Larry Delaey, Chatham (CA)

(73) Assignee: AarKel Tool and Die Inc, Wallaceburg (CA)

( * ) Notice: Subject to any disclaimer, the term of this patent is extended or adjusted under 35 U.S.C. 154(b) by 120 days.

(21) Appl. No.: 18/539,081

(22) Filed: Dec. 13, 2023

(65) Prior Publication Data
US 2024/0308120 A1    Sep. 19, 2024

Related U.S. Application Data

(60) Provisional application No. 63/432,684, filed on Dec. 14, 2022, provisional application No. 63/432,681, filed on Dec. 14, 2022.

(51) Int. Cl.
*B29C 45/34* (2006.01)
*B29C 33/38* (2006.01)
*B33Y 80/00* (2015.01)

(52) U.S. Cl.
CPC ........ *B29C 45/345* (2013.01); *B29C 33/3842* (2013.01); *B33Y 80/00* (2014.12)

(58) Field of Classification Search
None
See application file for complete search history.

(56) References Cited

U.S. PATENT DOCUMENTS 5,516,470 A * 5/1996 Larsson .............. B29C 45/7337
264/102
2021/0379803 A1* 12/2021 Hadar ..................... B29C 45/14

FOREIGN PATENT DOCUMENTS

WO    WO-2019/096419 A1 *  5/2019

\* cited by examiner

*Primary Examiner* — Mohammad M Ameen
(74) *Attorney, Agent, or Firm* — Olivo IP Law Group, P.C.; John W. Olivo, Jr.

(57) ABSTRACT

The present invention is directed to the design and production of a venting system contained in mold inserts for polymer grille formation, as well as a method for venting gas entrapment in any molding device. During the forming process of polymer grilles or any injection molded product, gas accumulates in the mold which needs to be vented out in a safe and effective manner. Venting out the gas without imposing alterations or blemishes on the product becomes a challenge. The present invention provides a solution to this issue through the use of porous material in the forming portion which allows the gas to escape from the mold without the use of vent apertures placed in the forming portion of the mold insert.

22 Claims, 16 Drawing Sheets

SYSTEM AND METHOD FOR MOLD INSERT VENTING AND VENTING GAS ENTRAPMENT IN ANY MOLDING DEVICE

CROSS REFERENCE TO RELATED APPLICATIONS

This application claims the benefit of U.S. Provisional Application Ser. No. 63/432,681, filed Dec. 14, 2022, and U.S. Provisional Application Ser. No. 63/432,684, filed Dec. 14, 2022, the contents of which are incorporated herein by reference.

BACKGROUND OF THE INVENTION

The present invention is directed to the design and production of a venting system contained in mold inserts for polymer grille formation, as well as a method for venting gas entrapment in any molding device. Polymer grilles have several applications including air purifier grilles, automobile leaf guard grilles, acoustic speaker grilles, and others. During the forming process of these polymer grilles, gas accumulates in the mold which must be vented out in a safe and effective manner.

Venting out the accumulated gas without imposing alterations or blemishes onto the design of the product becomes a challenge for all mold insert designs. The present invention provides a solution to this issue for any design of mold insert through the use of porous material, inverted funnel venting, and vent channels which work together to allow the gas to escape from the mold and decrease the likelihood of clogging within the mold insert without the use of vent apertures placed in the forming portion of the mold insert.

SUMMARY OF THE INVENTION

The present invention pertains to a system and method for venting gas contained in a mold insert. In one embodiment, the mold insert is constructed in three portions and is designed for the formation of polymer grilles. The topmost portion of the primary embodiment is constructed out of three-dimensional (3D) printed porous steel. This layer is also referred to as the forming portion or forming layer. The forming layer contains the 3D raised pattern which constitutes the mold for the polymer grille. The porous steel allows for the venting of gas which accumulates during the formation process, thus eliminating the need for vent apertures throughout the forming portion. The second, middle layer is constructed out of 3D printed solid steel. This layer contains 3D printed vent channels which assist the porous steel layer in venting the accumulated gas, as well as the upper half of the conformal cooling waterlines. The final base layer of the mold is constructed out of conventional computer numerical control (CNC) machined native steel. This layer contains the CNC machined bottom half of the conformal cooling waterlines and joins with the middle layer to form the vent channels and conformal cooling waterlines. The conformal cooling waterlines assist in the cooling and forming of the polymer grille in a uniform manner. Together, all three layers create the mold insert.

In an alternative embodiment, the mold insert is constructed in three portions. Similar to the primary embodiment, the topmost portion of the alternative embodiment is constructed out of 3D-printed porous steel. This layer is also referred to as the forming portion or forming layer. The forming layer contains the 3D raised pattern which on its topmost area which constitutes the mold for the polymer grille. The porous steel allows for the venting of gas which accumulates during the formation process, thus eliminating the need for vent apertures throughout the forming portion. The second, middle layer is constructed out of 3D printed solid steel. This layer contains 3D-printed vent channels which assist the porous steel layer in venting the accumulated gas. The final base layer of the mold is constructed out of conventional CNC-machined native steel and contains the CNC-machined traditional cooling waterlines. This layer joins with the middle layer to form the vent channels. Like the conformal cooling waterlines of the primary embodiment, the traditional cooling waterlines assist in the cooling and forming of the polymer grille in a uniform and even manner. Together, all three layers create the mold insert.

In another alternative embodiment, the mold insert is constructed in a unibody design where the entirety of the mold insert is constructed out of 3D-printed solid steel. The topmost section of the unibody design is also referred to as the forming portion. The forming portion contains the 3D raised pattern which constitutes the mold for the polymer grille, as well as porous slots located within the raised grid portion of the 3D raised pattern of the mold. The middle section contains 3D-printed clog-resistant funnel vent channels which connect to the porous slots in the forming layer in order to vent the accumulated gas. The final bottom section of the mold contains the 3D-printed conformal cooling waterlines. The conformal cooling waterlines assist in the cooling and forming of the polymer grille in a uniform and even manner. Together, all three sections constitute the mold insert.

In an alternative embodiment, the present invention can be used to vent gases in any mold insert design and is not limited to mold inserts for polymer grille formation. Injection molding is a popular method for producing a wide range of products including common plastic items such as electronic device casings, bottle caps, acoustic speaker grilles, decorative items, larger items such as car body panels, and more. During the injection molding process, liquid polymer or other casting material is injected into a forming portion of a mold insert and cooled into the desired shape for the desired product. As the liquid polymer or other casting material is cooled, gases accumulate in the forming portion which need to be evacuated in order to prevent any blemishes or damage caused by the presence of the gas. The present invention provides a system and method of removing the accumulating gases by venting them into a gas channel separate from the forming portion but still contained within the mold insert. The novelty of the present invention allows for the gases to be removed from the forming portion in an efficient manner in order to prevent blemishes and other defects to the molded product while also preventing any clogging within the mold insert during the molding process.

In this alternative embodiment, the present invention provides a general system and method for venting gases and is designed so that it may be applied to any mold insert for injection molding and is not specific to any one mold insert design. The present invention contains a system of porous slots, clog resistant inverted funnels and gas channels that are connected providing a method for the entrapped gases to immediately evacuate. The inverted funnel system prevents any clogging of the porous slots in the molding process.

The mold inserts in which the present invention can be designed within may be constructed out of various materials, such as solid steel, other metals, or other common or novel materials. The vent channels, porous slots, clog resistant funnels, and all other design aspects of the present invention can be formed within any mold insert via 3D-printing, CNC-machine cutting, or other methods of forming the design of the present invention within the material of the mold insert.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The various embodiments are illustrated by way of example, and not by way of limitation, in the figures of the accompanying drawings. Having thus described the invention in general terms, reference will now be made to the accompanying drawings, which are not necessarily drawn to scale, and wherein.

DETAILED DESCRIPTION OF THE PREFERRED EMBODIMENT

Figure 1A:
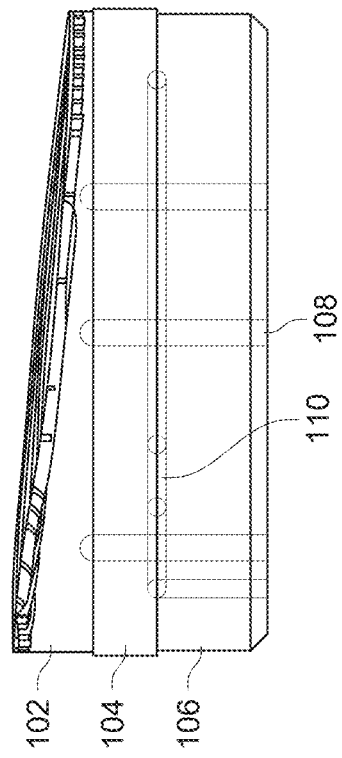
FIG. 1A is a visual model of the hybrid 3D printed mold insert with porous steel and conformal cooling.
Figure 1A:
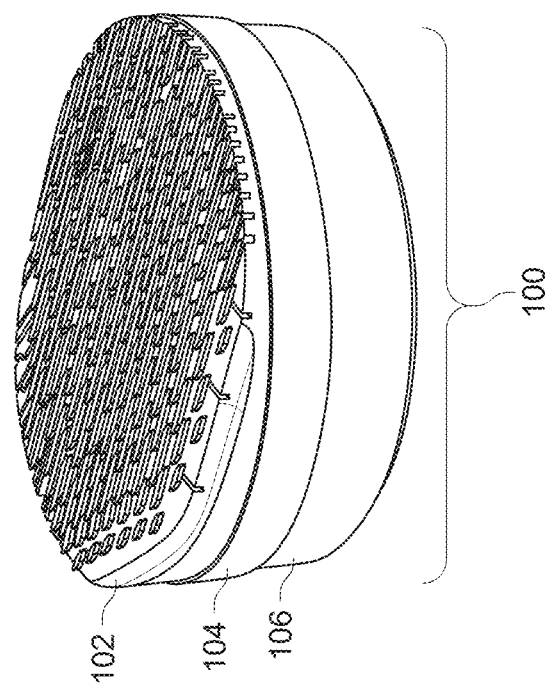

FIG. 1A is a visual model of the hybrid 3D printed mold insert with porous steel and conformal cooling. In accordance with the preferred embodiment, model 100 shows the outer surface of the model, including the topmost layer 102, the middle layer 104, and the base layer 106. Furthermore, the vent channels 108 and conformal cooling lines 110 are shown. More detail regarding the layers 102, 104, and 106 as well as the vent channels 108 and conformal cooling lines 110 is provided in FIGS. 1B and 1C.

Figure 1B:
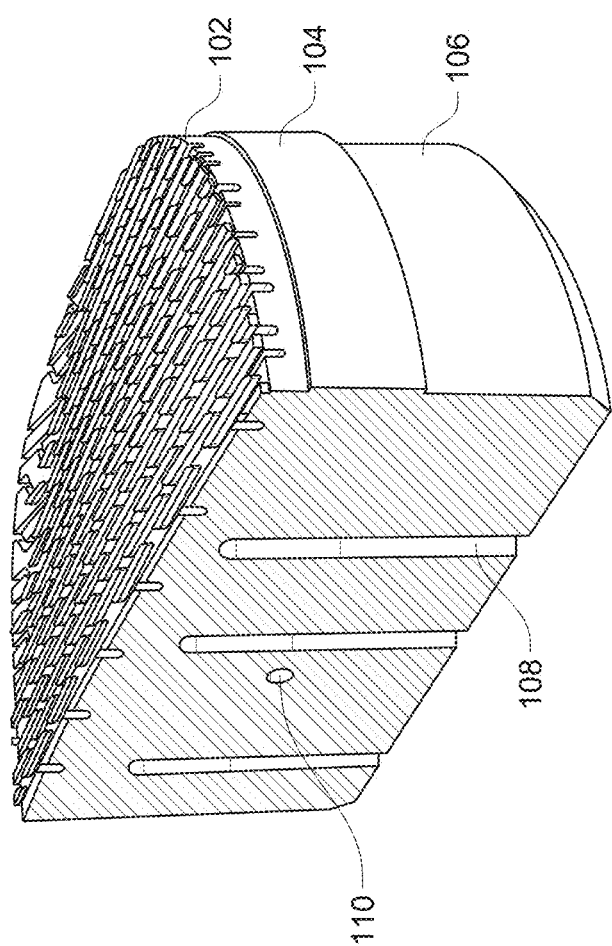
FIG. 1B is a visual cross-section model of the hybrid 3D printed mold insert with porous steel and conformal cooling.

FIG. 1B is a visual cross-section model of the hybrid 3D printed mold insert with porous steel and conformal cooling. In accordance with the preferred embodiment, the design of the mold insert is constructed in three pieces consisting of three separate layers or sections. The topmost layer 102 containing the raised grid pattern from which the holes in the polymer grille are formed is made from 3D-printed porous steel to allow for the venting of the gases that accumulate during the molding process. The middle layer 104 is a 3D-printed solid, and the bottom layer 106 is constructed with conventional CNC-machined native steel. Together, these three layers form the mold insert. From the cross-section view provided, the vertical vent channels 108 and the horizontal conformal cooling waterline 110 are also clearly shown, where the vent channels extend through the base layer 106 and up to the forming layer or topmost layer 102, and the conformal cooling waterline 110 lays horizontally in the middle layer 104.

Figure 1C:
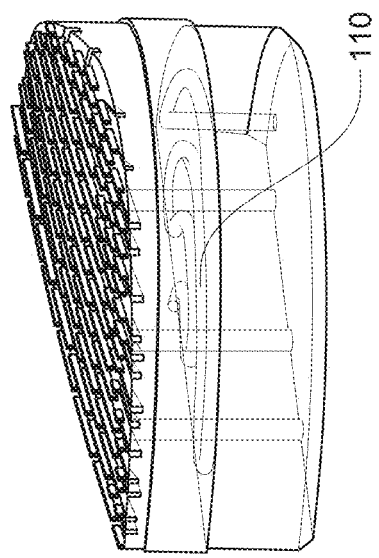
FIG. 1C is a visual cross-section model of the vent channels and conformal cooling channels contained within the hybrid 3D printed mold insert with porous steel.
Figure 1C:
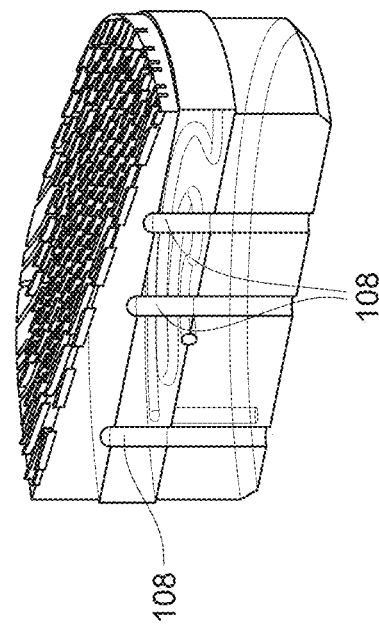

FIG. 1C is a visual cross-section model of the vent channels and conformal cooling channels contained within the hybrid 3D printed mold insert with porous steel and conformal cooling. In accordance with the preferred embodiment, the mold insert contains 3D-printed vent channels 108 in the middle and bottom layers 104 and 106. These channels vent gases from the porous steel section of the mold insert through the 3D-printed solid 104 and conventional CNC-machined native steel 106 sections of the mold insert. This allows for the gases which accumulate during the molding process to be ventilated out of the mold insert. These layers also contain the 3D-printed conformal cooling waterlines 110 of which the top half is 3D-printed and located in the middle layer 104 and the bottom half is CNC-machined and located in the bottom layer 106. These cooling water lines assist with the cooling process of the material placed in the mold in order to decrease production time and promote uniform cooling throughout the product.

Figure 2A:
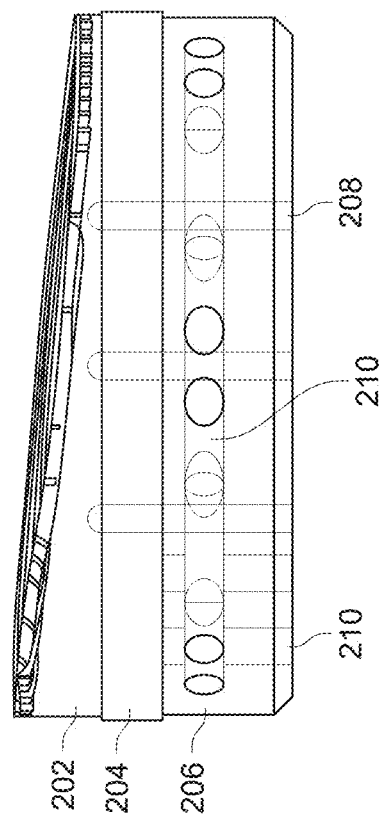
FIG. 2A is a visual model of the hybrid 3D printed mold insert with porous steel and traditional cooling.
Figure 2A:
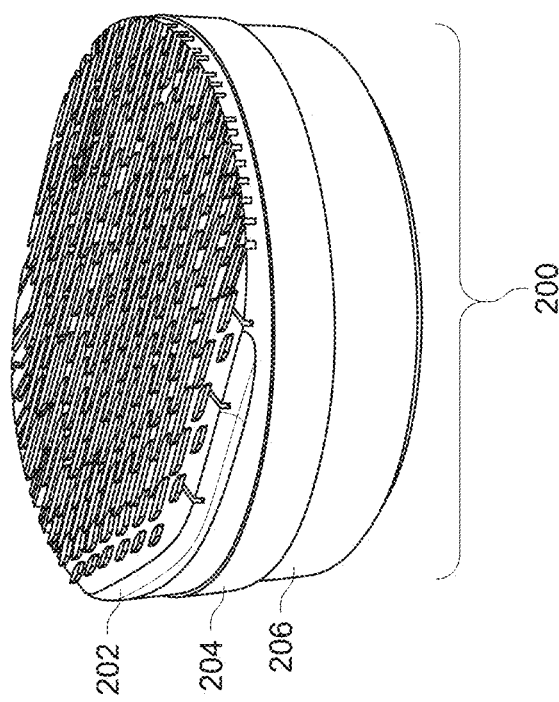

FIG. 2A is a visual model of the hybrid 3D printed mold insert with porous steel and traditional cooling. In accordance with the alternative embodiment, model 200 shows the entire mold insert as a completed unit, including the topmost layer 202, the middle layer 204, and the base layer 206. Furthermore, the vent channels 208 and traditional cooling waterlines 210 are shown. More detail regarding the layers 202, 204, and 206 as well as the vent channels 208 and traditional cooling waterlines 210 is provided in FIGS. 2B and 2C.

Figure 2B:
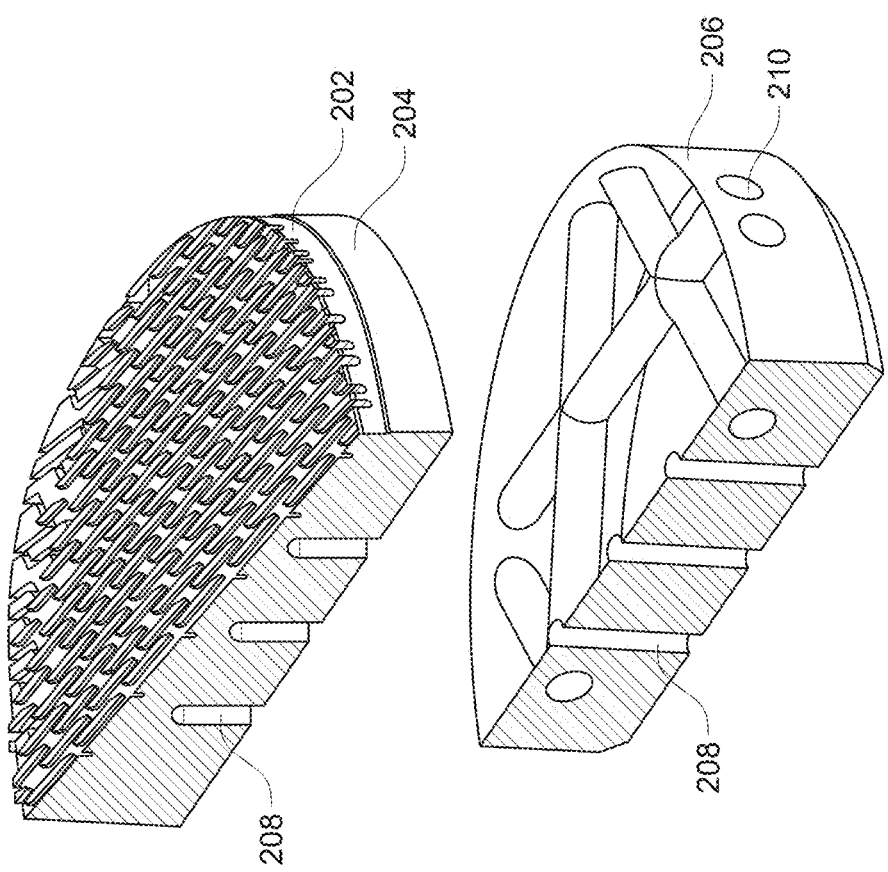
FIG. 2B is a visual cross-section model of the hybrid 3D printed mold insert with porous steel and traditional cooling.

FIG. 2B is a visual cross-section model of the hybrid 3D printed mold insert with porous steel and traditional cooling. In accordance with the alternative embodiment, the mold insert is constructed in three layers. The topmost layer 202 is constructed out of 3D-printed porous steel. The porous steel allows for the venting of gases without the use of vents in this layer. The middle layer 204 is constructed out of 3D-printed solid material and separates the forming top layer from the base layer 206. The base layer 206 is constructed from CNC machined in native steel.

Figure 2C:
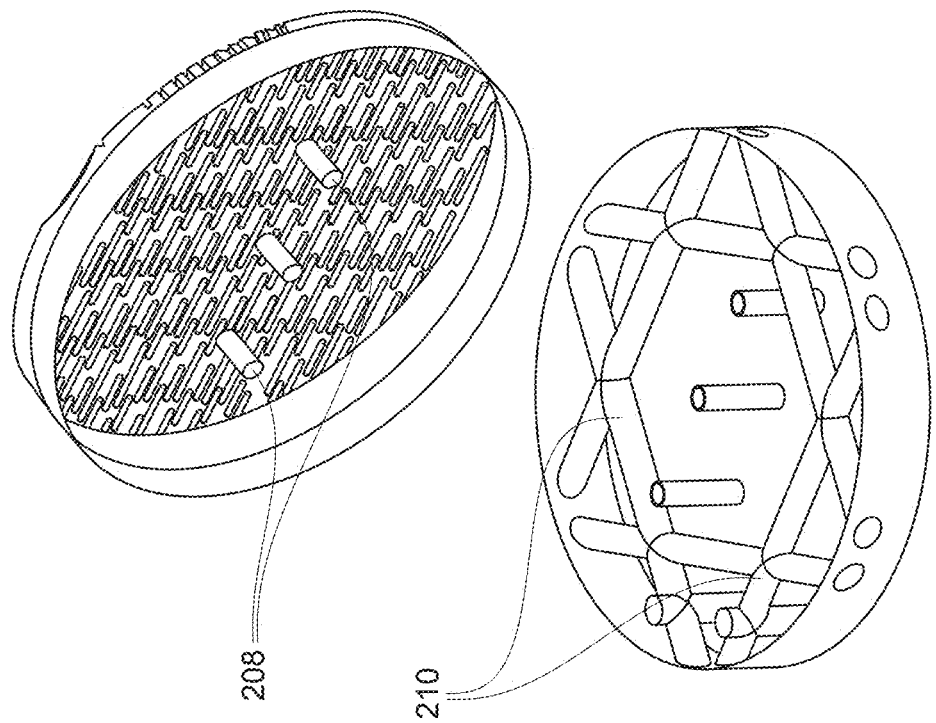
FIG. 2C is a sectional model of the hybrid 3D printed mold insert with porous steel and traditional cooling.
Figure 2C:
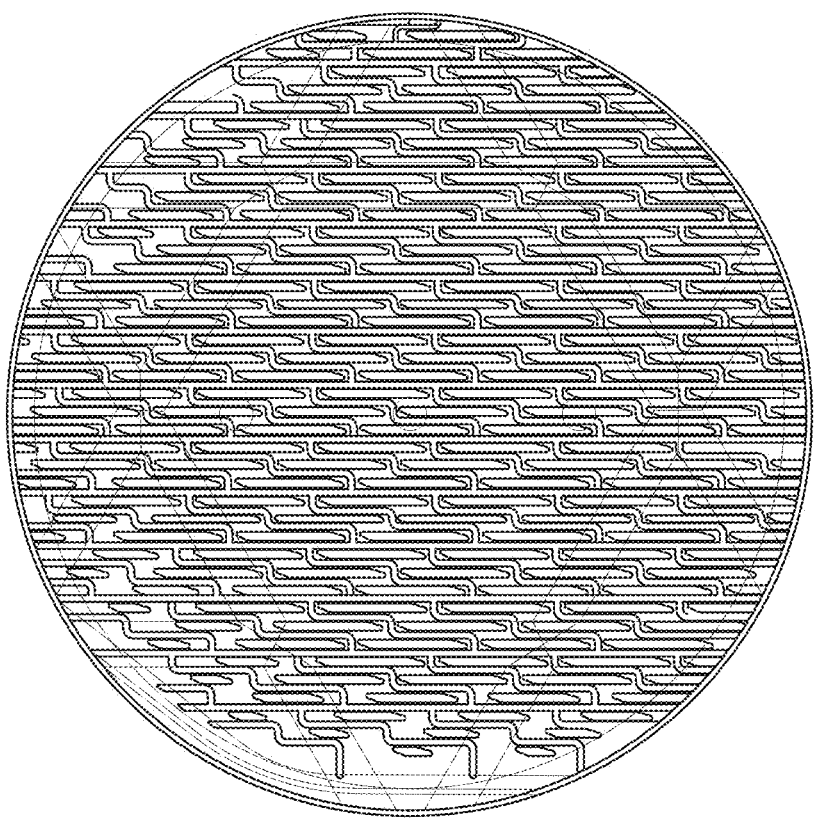

FIG. 2C shows a sectional model of the hybrid 3D printed mold insert with porous steel and traditional cooling. In accordance with the alternative embodiment, rather than conformal cooling, the alternative embodiment uses traditional waterlines 210 for cooling which are dispersed throughout the mold insert in an overlapping, triangular fashion. The vent channels 208 are then placed within the gaps between the cooling water lines.

Figure 3A:
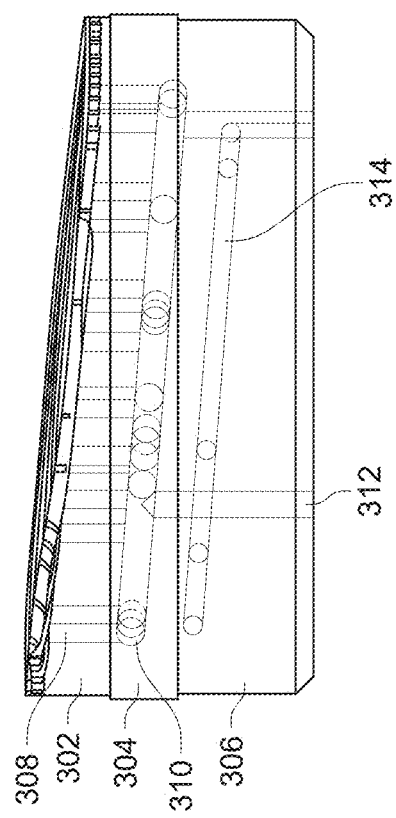
FIG. 3A is a visual model of the 3D printed mold insert with porous slots and conformal cooling.
Figure 3A:
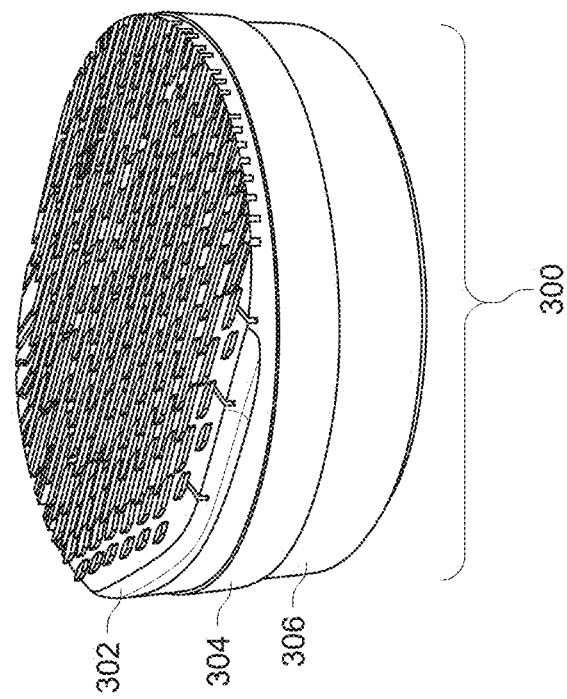

FIG. 3A is a visual model of the 3D printed mold insert with porous slots and conformal cooling. In accordance with the alternative embodiment, model 300 shows the entire mold insert as a completed unit, including the topmost layer 302, the middle layer 304, and the base layer 306. Furthermore, the porous slots 308, the vent channels 310, the vent exhaust 312, and conformal cooling lines 314 are shown. More detail regarding the layers 302, 304, and 306 as well as the porous slots 308, the vent channels 310, the vent exhaust 312, and conformal cooling lines 314 is provided in FIGS. 3B and 3C.

Figure 3B:
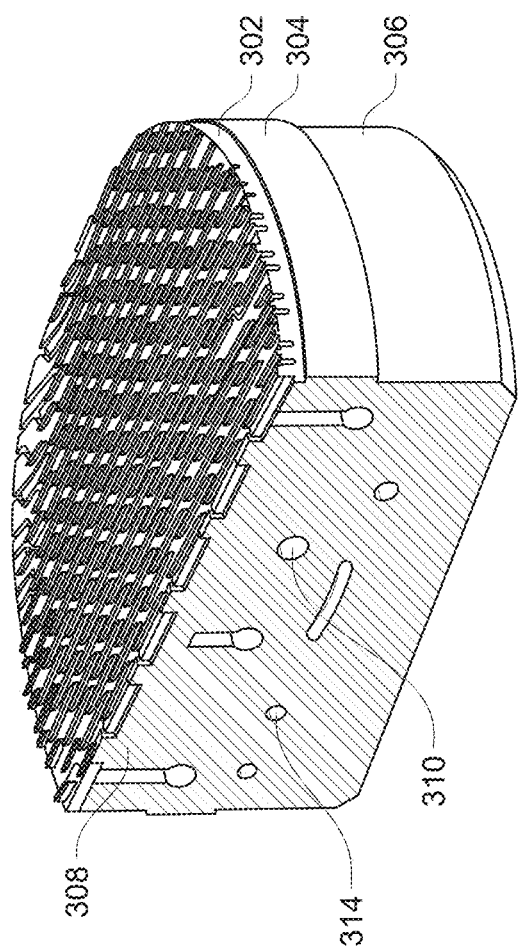
FIG. 3B is a cross-section model of the 3D printed mold insert with porous slots and conformal cooling.

FIG. 3B is a cross-section model of the 3D printed mold insert with porous slots and conformal cooling. In accordance with the alternative embodiment, the forming layer 302, the middle layer 304, and the base layer 306 are constructed out of 3D-printed solid in a unibody design. From the cross-sectional view the porous slots 308, the vent channels 310, and the cooling waterlines 314 are also shown.

Figure 3C:
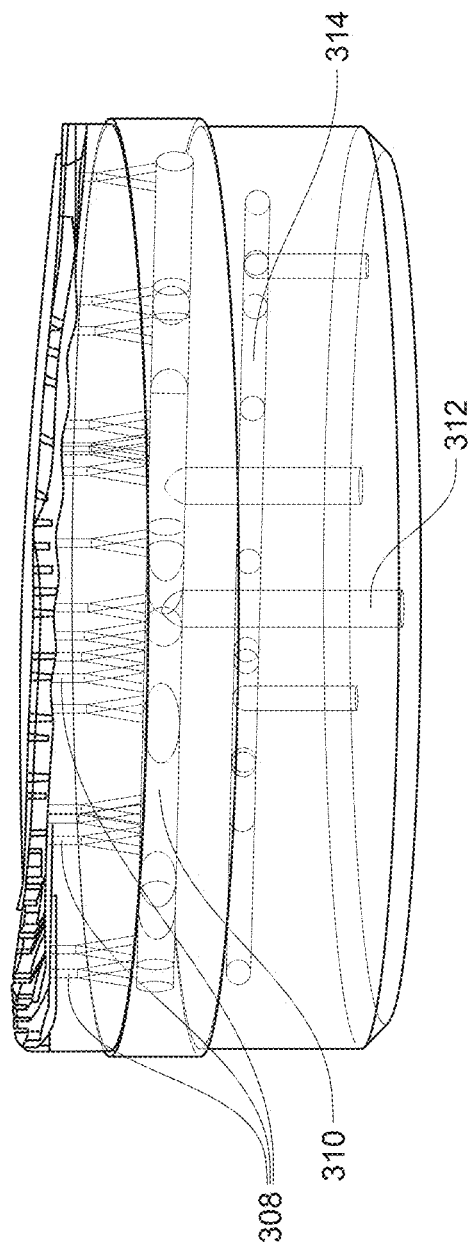
FIG. 3C is a visual model of the internal structure of the 3D printed mold insert with porous slots and conformal cooling.

FIG. 3C is a visual model of the internal structure of the 3D printed mold insert with porous slots and conformal cooling. In accordance with the alternative embodiment, the forming layer 302, which is constructed out of 3D-printed solid material, contains 3D-printed porous slots 308 which are strategically placed along the surface using Mold Flow Analysis in order to allow for the venting of gasses through the forming layer 302. In the middle layer 304 of the mold insert, a vent channel 310 connects the porous slots 308 to the vent channel exhaust 312 which expels the gases from inside the mold insert into the atmosphere. The middle and base layers 304 and 306, respectively, also contain 3D-printed conformal cooling water lines 314 to promote increased cooling time and uniform cooling throughout the mold insert.

Figure 3D:
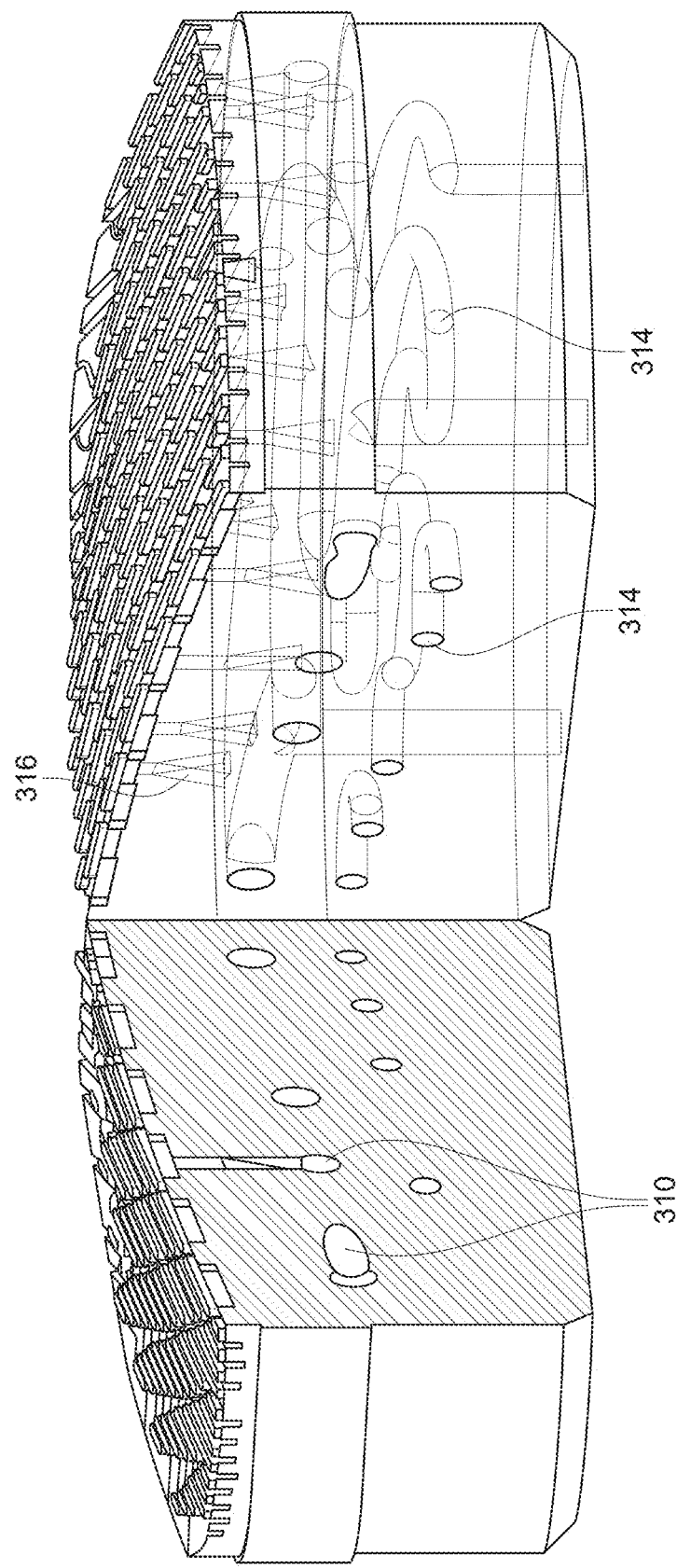
FIG. 3D is a visual model of a cross-section and internal structure view of the 3D printed mold insert with porous slots and conformal cooling.

FIG. 3D is a visual model of a cross-section and internal structure view of the 3D printed mold insert with porous slots and conformal cooling. In accordance with the alternative embodiment, the cross section shows vent channels which can be seen dispersed throughout the middle layer of the mold insert. The 3D-printed inverted funnel 316 is designed in such a way that the cross-sectional area expands from the topmost portion of the slot to the bottommost portion of the slot which connects the porous slots 308 to the vent channels 310. The shape of the transition section between the porous slots 308 and the vent channels 310 is best described as an inverted funnel 316. Located just below these vent channels are the 3D-printed conformal cooling waterlines 314.

Figure 3E:
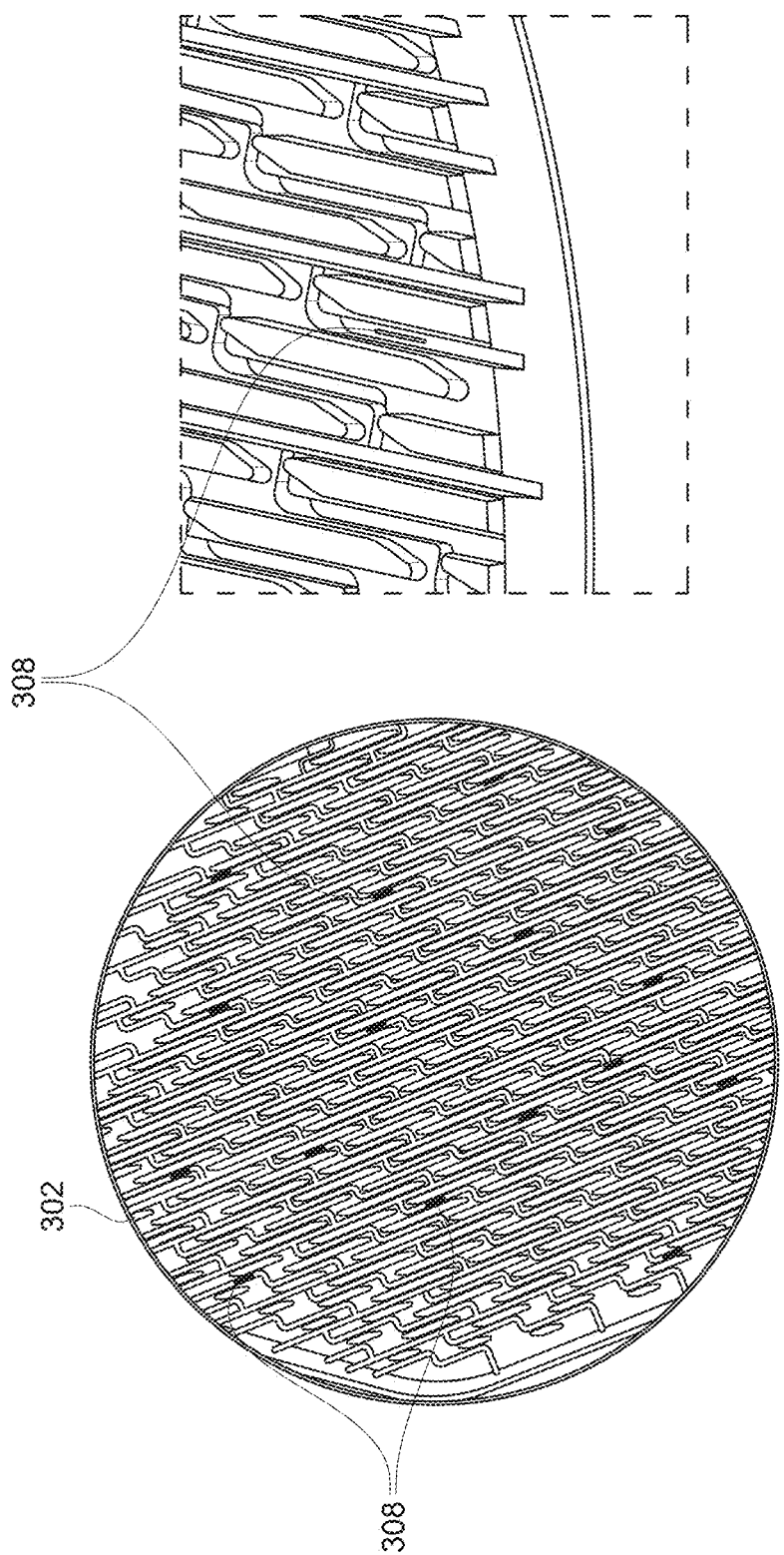
FIG. 3E is a top-down view of the mold insert.

FIG. 3E provides a top-down view of the mold insert. A plurality of porous slots 308 can be seen strategically placed along the surface of the forming layer 302 of the mold insert. In accordance with the alternative embodiment, these porous slots 308 allow for the accumulated gases to escape the mold insert during the forming process.

Figure 3F:
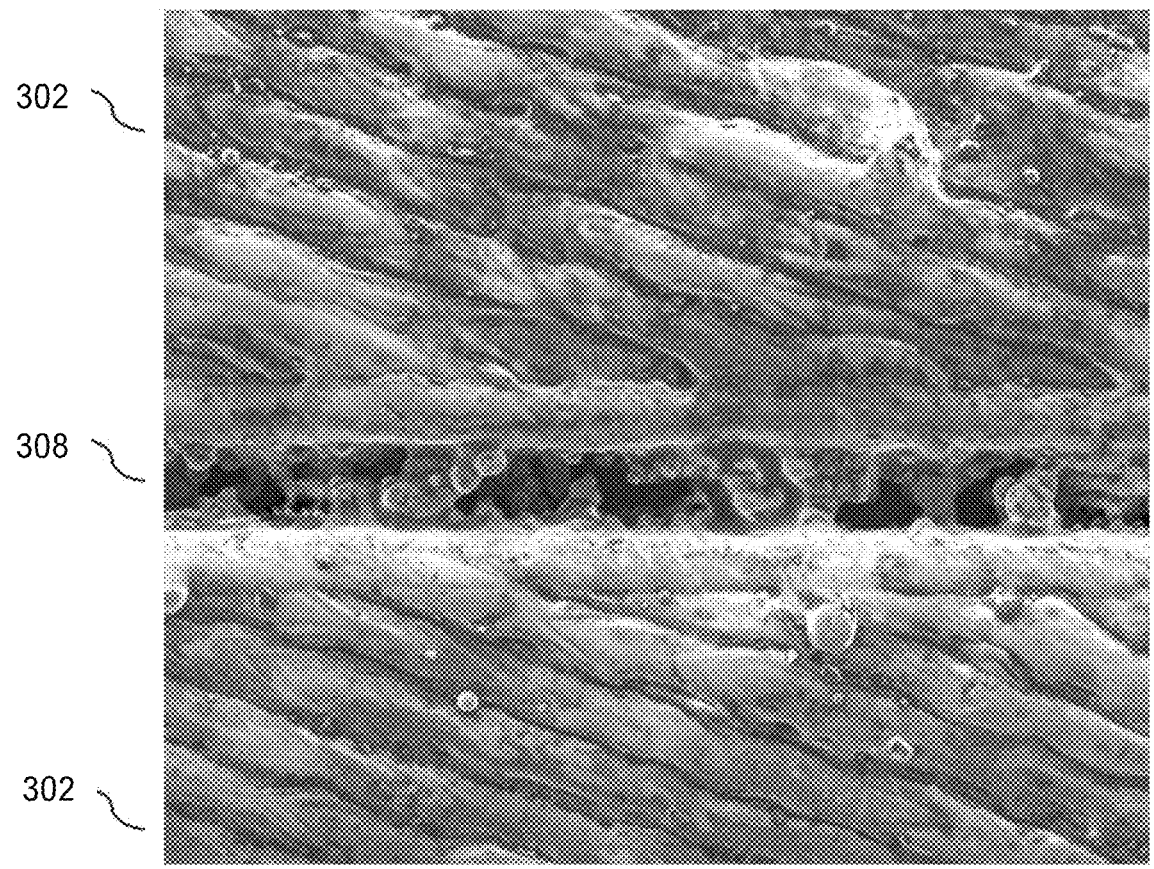
FIG. 3F is a microscopic image of the porous steel slots.

FIG. 3F is a microscopic image of the porous steel slots. In accordance with the alternative embodiment, slots of porous steel 308 are 3D-printed within the solid steel surface of the forming layer 302 of the mold insert at strategically placed locations. These locations are determined with the use of Mold Flow Analysis in order to optimize the venting of gases through the porous slots and into the vent channels where the gas will eventually be exhausted into the atmosphere and out of the mold insert.

Figure 4A:
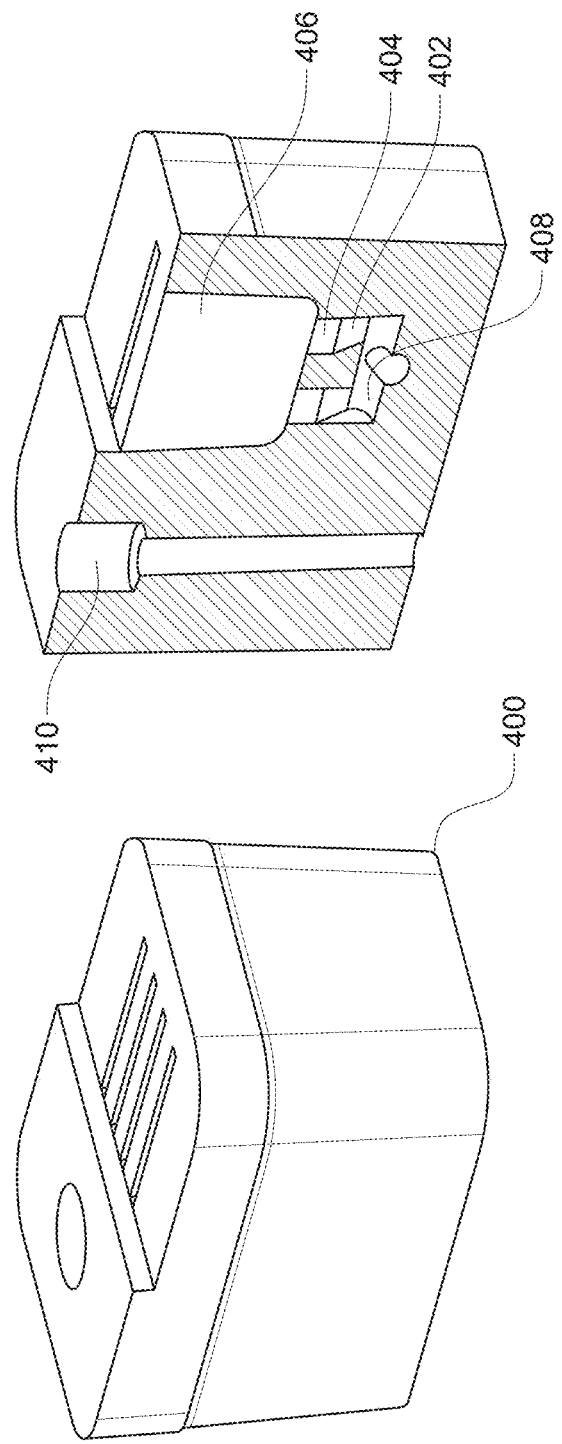
FIG. 4A is a visual model of a gas venting system for any mold insert.

FIG. 4A is a visual model of a venting system for a mold insert. In accordance with the alternative embodiment, the system 400 contains a mold insert consisting of a plurality of porous slots 404 and vent channels 408. The venting system specifically consists of the mold inserts rib sections 406, the porous slots 404, the inverted funnel vents 402, and the vent channels 408. Furthermore, a counterbore hole 410 for a bolt is shown, wherein a bolt is inserted into the counterbore hole 410 to secure the insert into the mold.

Figure 4B:
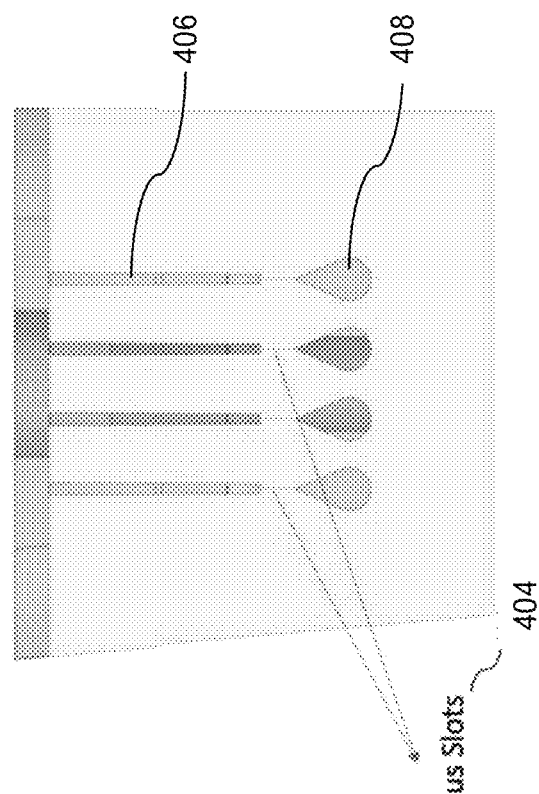
FIG. 4B is an X-ray and cross-sectional visual model of the clog resistant inverted funnel system and porous slots used in the venting system of any mold insert.
Figure 4B:
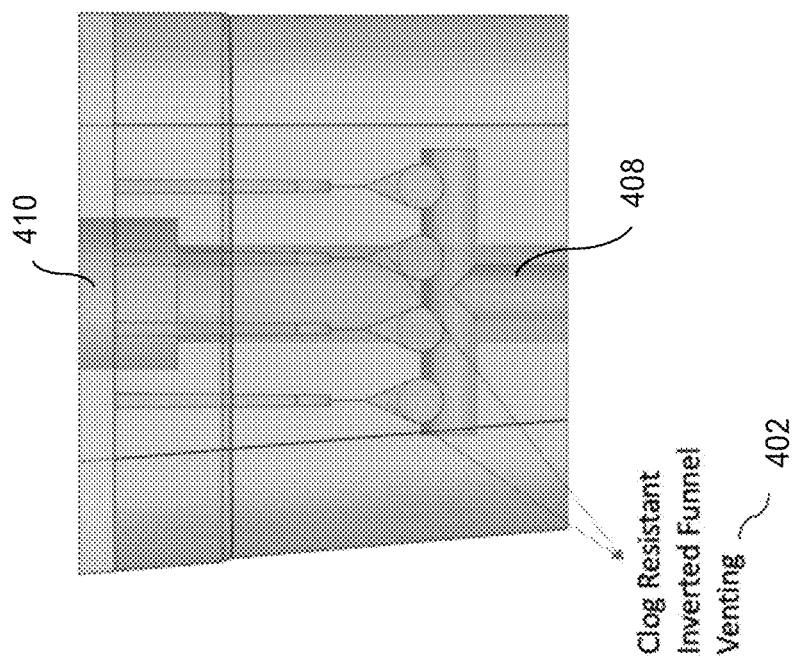

FIG. 4B is an X-ray and cross-sectional visual model of the clog resistant inverted funnel vents 402 and porous slots 404 used in the venting system of the mold insert. In accordance with the alternative embodiment, clog-resistant inverted funnel vents 402 connects the porous slots 404 to the vent channels below. These clog resistant inverted funnel vents 402 prevent the accumulation of gas within the mold insert and increase the speed and efficiency at which the gas is vented out of the mold insert via vent channels 408.

Figure 4C:
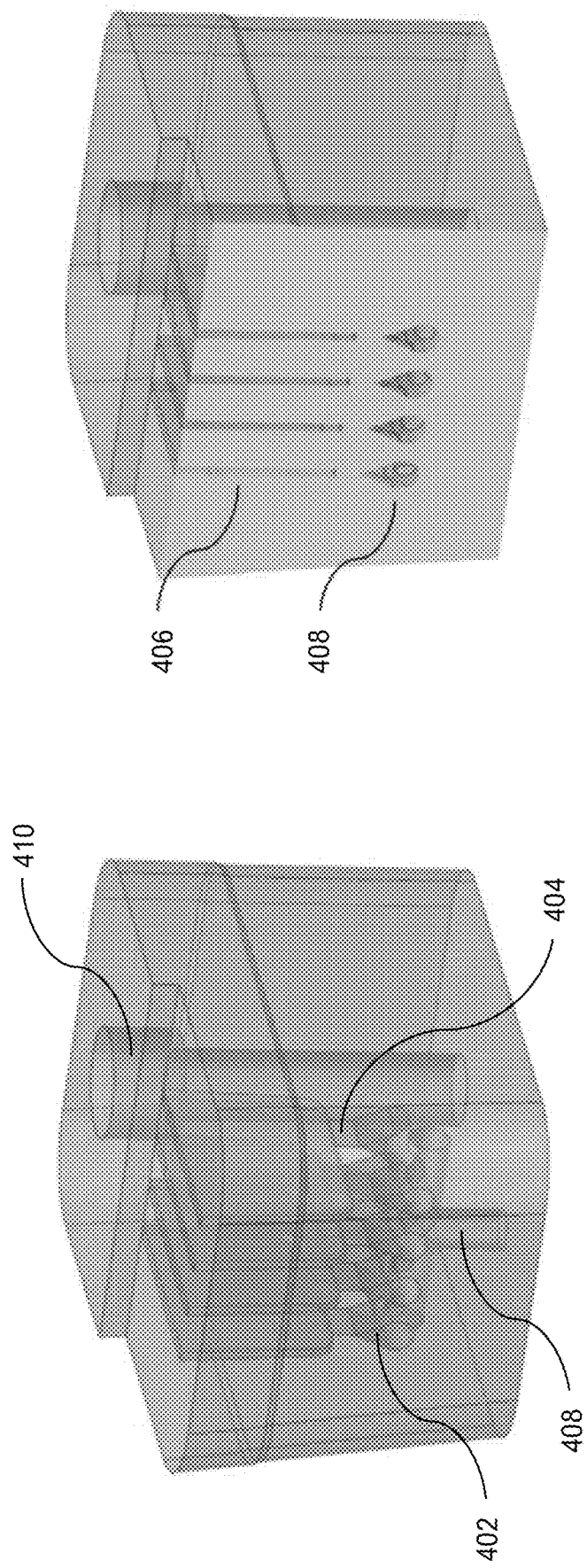
FIG. 4C is an X-ray and cross-sectional visual model of the gas channels and porous slots used in the venting system of a mold insert.

FIG. 4C is an X-ray and cross-sectional visual model of the vent channels and a plurality of porous slots 404 used in the venting system of a mold insert. In accordance with the alternative embodiment, liquid polymer is used in the mold insert and flows down the mold inserts rib sections 406. At the bottom of rib sections in the mold insert are a plurality of porous slots 404 that allow the gases which accumulate during the forming process to vent out of the mold insert and into the vent channels 408 via the inverted funnel vents 402.

Figure 4D:
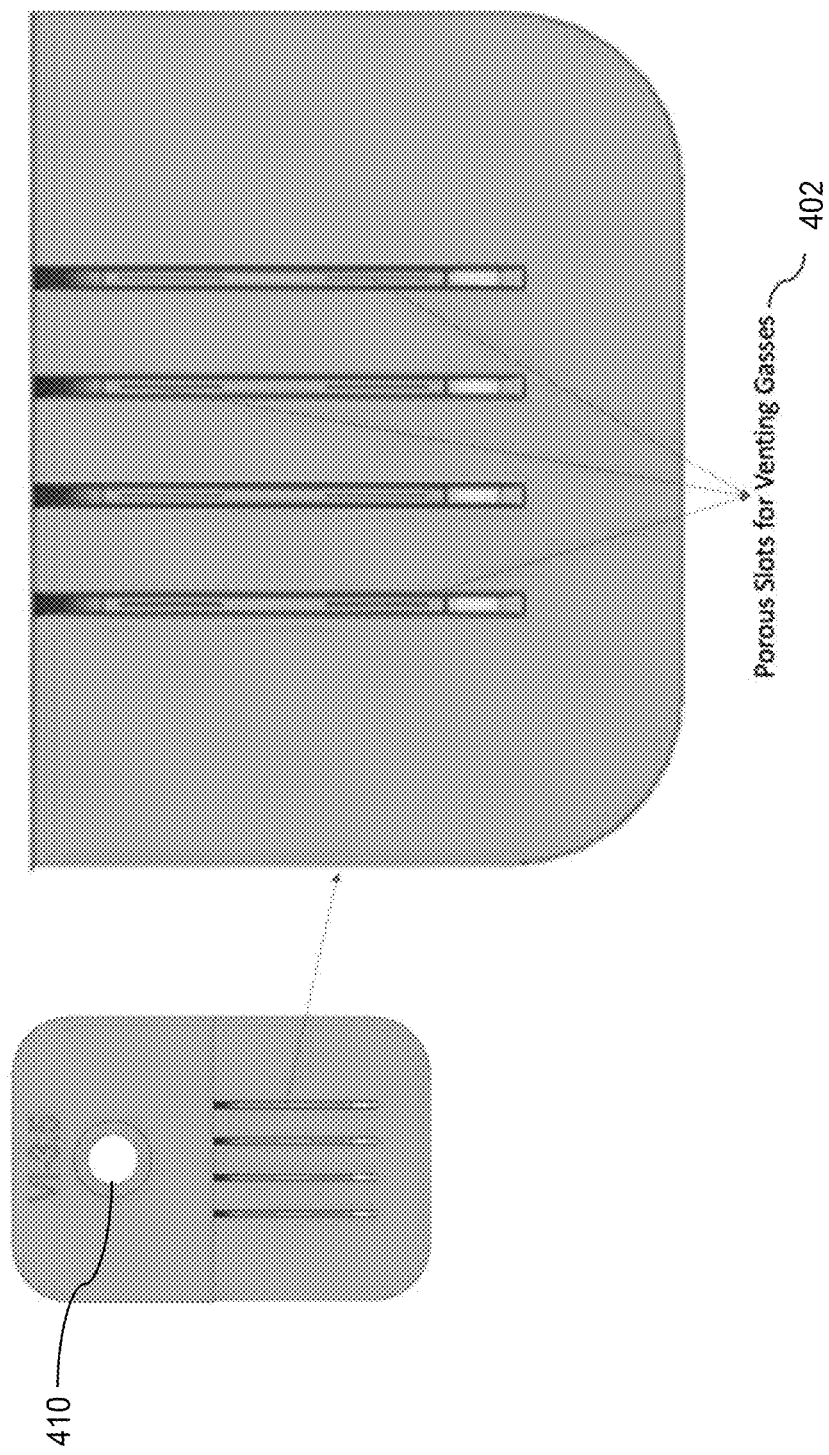
FIG. 4D is a close-up visual model of the porous slots used for gas venting in any mold insert.

FIG. 4D is a close-up visual model of the porous slots used for venting in the mold insert. In accordance with the preferred embodiment, a plurality of porous slots 404 are strategically placed along the surface of the mold insert based on Mold Flow Analysis in order to increase venting efficiency. Said plurality of porous slots 404 allow gasses to vent out of the mold insert and into vent channels where the gas is eventually exhausted out of the mold insert and into the atmosphere.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A system for venting gases in a mold insert constructed in a plurality of layers, said system comprising:
   a forming layer of porous steel;
   a middle layer of solid steel;
   a base layer of solid steel;
   a plurality of vent channels within said middle layer and said base layer; and
   a plurality of cooling waterlines within said middle layer.

2. The mold insert of claim 1, wherein said forming layer is constructed via three-dimensional printing.

3. The mold insert of claim 1, wherein said middle layer is constructed via three-dimensional printing.

4. The mold insert of claim 1, wherein said base layer is constructed via three-dimensional printing.

5. The mold insert of claim 1, wherein said plurality of cooling waterlines are conformal.

6. The mold insert of claim 1, wherein said plurality of cooling waterlines are traditional.

7. The mold insert of claim 1, wherein said forming layer is of solid steel containing a plurality of inverted funnel-shaped slots of porous steel which connect to said plurality of vent channels.

8. The mold insert of claim 1, wherein said plurality of vent channels connect to at least one vent channel exhaust which expels a gas from said mold insert.

9. The mold insert of claim 1, wherein a topmost area of said forming layer contains a raised grid pattern.

10. A method for venting gases from a mold insert, said method comprising:
    inserting a liquid polymer into a mold insert, wherein said mold insert contains a plurality of porous slots, a plurality of vent channels connected to said plurality of porous slots and at least one vent channel exhaust, and wherein said liquid polymer flows down at least one rib section of said mold insert;
    venting, via said plurality of porous slots, at least one gas from said mold insert into said plurality of vent channels, wherein said plurality of vent channels are connected to said at least one vent channel exhaust; and
    exhausting said at least one gas via said at least one vent channel exhaust.

11. The method of claim 10, wherein said plurality of porous slots consist of porous steel.

12. The method of claim 10, wherein said plurality of porous slots are of inverted funnel shape.

13. The method of claim 10, wherein said plurality of porous slots are three-dimensionally printed.

14. The method of claim 10, wherein said mold insert further comprises a plurality of cooling waterlines.

15. A system for venting gases in a mold insert constructed in a plurality of layers, said system comprising:
    a forming layer of solid steel containing a plurality of porous slots, wherein a top-most portion of said forming layer contains a raised grid pattern;
    a middle layer of solid steel, wherein said middle layer further comprises a plurality of vent channels and a plurality of cooling waterlines; and
    a base layer of solid steel, wherein said base layer contains a plurality of vent channels in alignment with said plurality of vent channels of said middle layer.

16. The mold insert of claim 15, wherein said forming layer is constructed via three-dimensional printing.

17. The mold insert of claim 15, wherein said middle layer is constructed via three-dimensional printing.

18. The mold insert of claim 15, wherein said base layer is constructed via three-dimensional printing.

19. The mold insert of claim 15, wherein said plurality of cooling waterlines are conformal.

20. The mold insert of claim 15, wherein said plurality of cooling waterlines are traditional.

21. The mold insert of claim 15, wherein said forming layer is of porous steel.

22. The mold insert of claim 15, wherein said plurality of vent channels connect to at least one vent channel exhaust which expels a gas from said mold insert.

* * * * *